（12） United States Patent
Higuchi et al.

(10) Patent No.: US 10,493,773 B2
(45) Date of Patent: Dec. 3, 2019

(54) IMAGE PRODUCING DEVICE, TRANSFER RIBBON AND IMAGE PRODUCING METHOD

(71) Applicant: TOPPAN PRINTING CO., LTD., Tokyo (JP)

(72) Inventors: Noriaki Higuchi, Tokyo (JP); Tomoyuki Marugame, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/232,871

(22) Filed: Dec. 26, 2018

(65) Prior Publication Data

US 2019/0126635 A1    May 2, 2019

Related U.S. Application Data

(60) Division of application No. 15/606,706, filed on May 26, 2017, now abandoned, which is a continuation of
(Continued)

(30) Foreign Application Priority Data

Nov. 28, 2014 (JP) ................................. 2014-241968

(51) Int. Cl.
*B41J 2/325* (2006.01)
*B41J 17/00* (2006.01)
(Continued)

(52) U.S. Cl.
CPC ............... *B41J 2/325* (2013.01); *B41J 17/00* (2013.01); *B41M 5/382* (2013.01);
(Continued)

(58) Field of Classification Search
CPC ...... B41J 2/325; B41J 17/00; B41M 5/38207; B41M 5/41; B41M 5/40; B41M 5/382;
(Continued)

(56) References Cited

U.S. PATENT DOCUMENTS 5,721,058 A * 2/1998 Fujimaki ............ B41M 5/38207
106/31.29
2008/0216688 A1 9/2008 Hoffman et al.
2014/0049587 A1 2/2014 Rieck et al.

FOREIGN PATENT DOCUMENTS

EP    2468516 A1    6/2012
JP    S60-101066 A    6/1985
(Continued)

OTHER PUBLICATIONS

IP.com search (Year: 2019).*
(Continued)

*Primary Examiner* — Lisa Solomon
(74) *Attorney, Agent, or Firm* — Foley & Lardner LLP

(57) ABSTRACT

An image producing device that produces an image by thermally transferring an image pattern from a transfer ribbon to a transfer medium. The device includes take-up means for taking up the transfer ribbon, supply means for supplying the transfer ribbon according to the taking up of the transfer ribbon performed by the take-up means, thermal transfer means for thermally transferring an image to the transfer medium by bringing the transfer ribbon that is between the supply means and the take-up means into contact with the transfer medium, and a regulating means for regulating the supply of the transfer ribbon performed by the supply means.

6 Claims, 20 Drawing Sheets

Related U.S. Application Data application No. PCT/JP2015/083091, filed on Nov. 25, 2015.

(51) Int. Cl.
| | | |
|---|---|---|
| *G03H 1/02* | (2006.01) | |
| *B41M 5/382* | (2006.01) | |
| *B41M 5/40* | (2006.01) | |
| *B41M 5/41* | (2006.01) | |
| *B42D 25/40* | (2014.01) | |
| *B41M 3/14* | (2006.01) | |

(52) U.S. Cl.
CPC .......... *B41M 5/38207* (2013.01); *B41M 5/40* (2013.01); *B41M 5/41* (2013.01); *B42D 25/40* (2014.10); *G03H 1/02* (2013.01); *B41M 3/14* (2013.01)

(58) Field of Classification Search
CPC .......... B41M 3/14; B42D 25/40; G03H 1/02; G03H 1/0011
See application file for complete search history.

(56) References Cited

FOREIGN PATENT DOCUMENTS

| | | |
|---|---|---|
| JP | H03-82580 A | 4/1991 |
| JP | H03-20767 A | 1/1995 |
| JP | H81971 A | 1/1996 |
| JP | H11-208082 A | 8/1999 |
| JP | 2000-001035 A | 1/2000 |
| JP | 2000-211257 A | 8/2000 |
| JP | 2000-214749 A | 8/2000 |
| JP | 2006-021386 A | 1/2006 |
| JP | 2012-173464 A | 9/2012 |

OTHER PUBLICATIONS

International Search Report for International Patent Application No. PCT/JP2015/083091 dated Feb. 16, 2016.
Extended European Search Report dated Jun. 25, 2018 in corresponding Application No. 15863377.5.
IP.com Search.
Japan Office Action dated Jul. 30, 2019 regarding Patent Application No. 2016-561917—5 pages.

\* cited by examiner

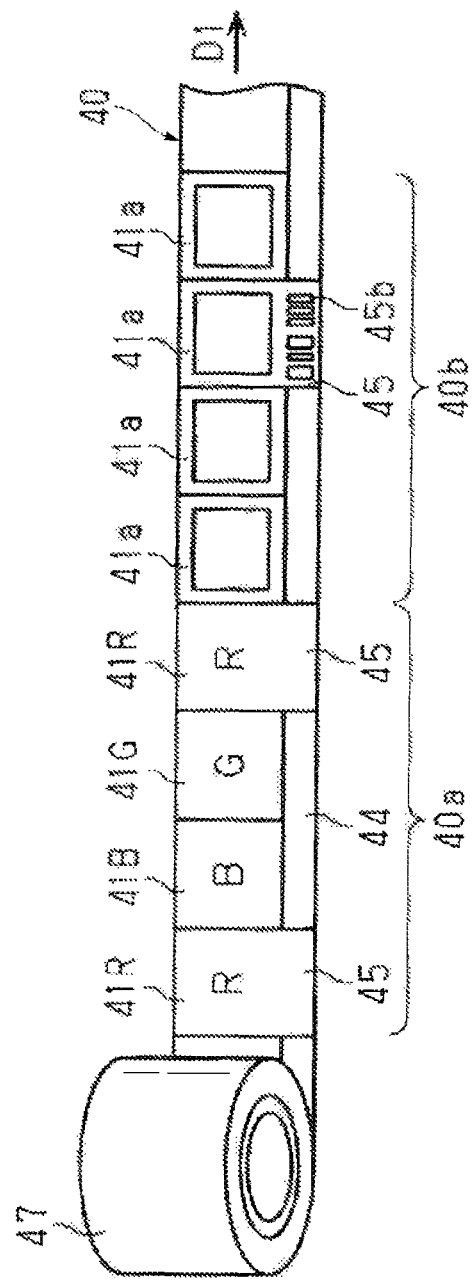

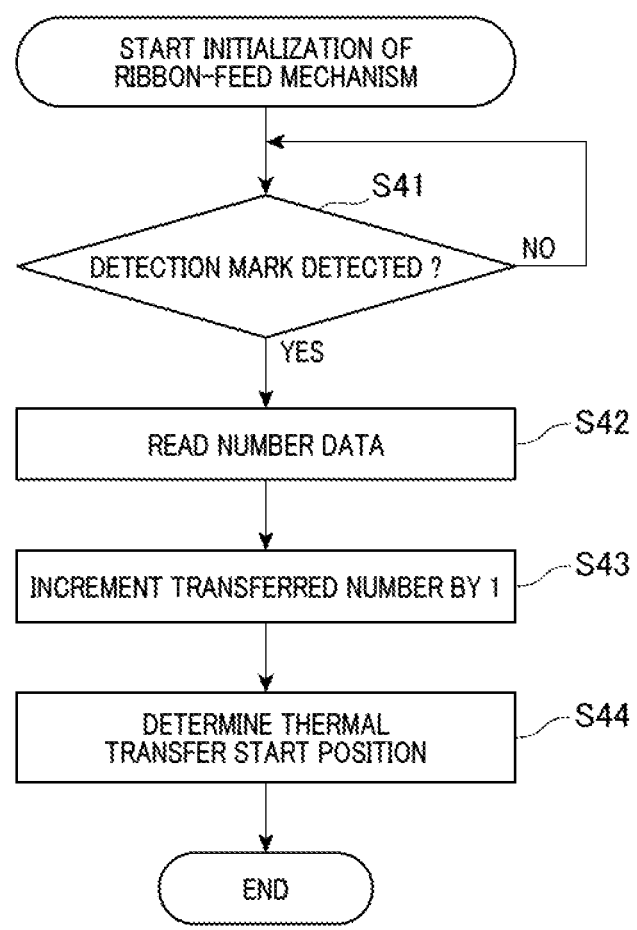

IMAGE PRODUCING DEVICE, TRANSFER RIBBON AND IMAGE PRODUCING METHOD

CROSS-REFERENCE TO RELATED PATENT APPLICATIONS

This application is a Divisional of U.S. patent application Ser. No. 15/606,706, filed on May 26, 2017, which is a Bypass Continuation of International Patent Application No. PCT/JP2015/083091, filed on Nov. 25, 2015, which is based upon and claims the benefit of priority of Japanese Patent Application No. 2014-241968, filed on Nov. 28, 2014. The entire contents of which are hereby incorporated by reference in their entireties.

TECHNICAL FIELD

The present invention relates to an image producing device for forming a holographic image, a transfer ribbon, and an image producing method.

BACKGROUND

As a method of forming a holographic image on an object to prevent forgery or alteration, a so-called intermediate transfer method is known. With this method, an image is produced by forming a holographic image pattern on a transfer medium using a transfer ribbon, after which the holographic image pattern of the image is transferred onto an object. For example, PTL 1 describes forming an image pattern by pressing a transfer ribbon against a transfer foil (transfer medium) using a thermal head. PTL 1 describes that a multi-colored image pattern is formed by providing panels (image-forming layers) for a first color, a second color and a third color in that order on a transfer ribbon, and transferring the first color, second color and third color by constantly moving the ribbon in one direction, and returning the transfer foil in the opposite direction after each time the first color has been transferred.

CITATION LIST

Patent Literature

PTL 1: JP H07-20767 A

SUMMARY OF THE INVENTION

Technical Problem

However, in a device that performs printing using an intermediate transfer method such as described in PTL 1, the printing range may shift depending on the diameter of the curve formed by the transfer ribbon, so the size of the panel of each color on the transfer ribbon is made larger than the printed region. Therefore, the cost of printing may increase.

Taking the above into consideration, an object of the present invention is to provide an image producing device, a transfer ribbon and an image producing method that can lower and even minimize costs for producing an image by an intermediate transfer method.

Solution to Problem

In order to accomplish the object, the image producing device according to an aspect of the present invention is an image producing device that produces an image by transferring an image pattern from a transfer ribbon to a transfer medium by thermal transfer. The device includes take-up means, supply means, thermal transfer means, and regulating means. The take-up means takes up the transfer ribbon. The supply means supplies the transfer ribbon according to the taking up of the transfer ribbon performed by the take-up means. The thermal transfer means thermally transfers an image to the transfer medium by bringing the transfer ribbon that is between the supply means and the take-up means into contact with the transfer medium. The regulating means regulates the supply of the transfer ribbon performed by the supply means.

With the image producing device described above, the regulating means regulating the supply of the transfer ribbon performed by the supply means can suppress extra movement or the like of the transfer ribbon. Therefore, the movement of the transfer ribbon is more accurately controlled, and thus costs related to the transfer ribbon are reduced. Accordingly, costs incurred in producing an image are reduced.

According to the aspect, the regulating means regulates supply of the transfer ribbon performed by the supply means in a state in which the transfer ribbon and the transfer medium are in contact, after thermal transfer performed by the thermal transfer means is finished. The take-up means starts taking up the transfer ribbon in a state in which the regulating means is regulating the supply of the transfer ribbon performed by the supply means. The thermal transfer means releases contact between the transfer ribbon and the transfer medium caused by the thermal transfer means, after the take-up means has started taking up the transfer ribbon.

With this kind of configuration, the transfer ribbon is prevented from being loosened when the thermal transfer means is moved. Accordingly, the movement of the transfer ribbon is more accurately controlled, and costs incurred in producing an image are reduced.

According to the aspect, the transfer ribbon includes an elongated substrate material on which panels having a diffraction grating structure are repeatedly formed in a feeding direction that is a lengthwise direction of the substrate material, and includes a detection mark having a reflective structure. The image producing device includes a first detection sensor that detects the detection mark, and a controller that drives a thermal head included in the thermal transfer means, and causes the transfer head to thermally transfer the panels conforming to an image to be recorded, onto the transfer medium, while causing the transfer head to thermally transfer the detection mark onto the transfer medium. The controller causes a ribbon feeding mechanism to feed the transfer ribbon during an initialization process. When the detection mark at the head in the feeding direction is detected by the first detection sensor, the controller determines a thermal transfer start position for the panel corresponding to the detected detection mark.

With this kind of configuration, the start of the unused portion of the transfer ribbon can be accurately detected. Therefore, the transfer ribbon can be used from the first unused panel without skipping over several unused panels even when the transfer ribbon is reset in resuming use of the image producing device. Accordingly, the transfer ribbon is used without waste.

According to the aspect, the image producing device further includes a second sensor that detects a transferred detection mark that is the detection mark thermally transferred to a transfer medium. The controller causes a sheet-feeding mechanism to feed the transfer medium during the initialization process. When the transferred detection mark at the head is detected by the second detection sensor, the controller determines a transfer start position for the transfer medium.

With the configuration described above, the start of a blank area of the transfer medium can be accurately detected. In other words, images are continuously formed without providing blank areas to the transfer medium. Therefore, the transfer medium can be used without waste.

According to the aspect, the controller causes the thermal head to thermally transfer the detection mark to the transfer medium with a specific pattern generated according to data that indicates the number of the images that have been transferred to the transfer medium. During the initialization process, the controller generates data from the specific pattern detected by the detection sensor, the data indicating the number of the images that have been transferred.

With this kind of configuration, when the transfer ribbon has been demounted from the device and operation is not performed continuously, it is possible to know the number of images that have been transferred up to that point and to perform accurate management of the number of images by reading the specific pattern of the detection mark during the initialization process when resuming the operation.

According to the aspect, during the initialization process, the controller causes the ribbon-feeding mechanism to feed the transfer ribbon in the feeding direction and in a direction opposite the feeding direction, and causes the first detection sensor to detect the detection mark at the head in the feeding direction.

With the configuration described above, the detection mark can be reliably detected.

According to the aspect, during the initialization process, the controller causes the sheet-feeding mechanism to feed the transfer medium in the feeding direction and in a direction opposite the feeding direction, and causes the second detection sensor to detect the transferred detection mark at the head in the direction opposite the feeding direction of the transfer medium.

With this kind of configuration, the transferred detection mark can be reliably detected.

A transfer ribbon according to an aspect of the present invention is the transfer ribbon used in the image producing device described above. The transfer ribbon is characterized in that the ribbon includes an elongated substrate material, panels having a diffraction grating structure and repeatedly provided on the elongated substrate material, and a detection mark having a reflective structure and formed on the panels.

In an image producing method according to an aspect of the present invention, the method is performed by an image producing device that produces an image by thermally transferring an image pattern onto a transfer medium from a transfer ribbon. The method is characterized by the image producing device including take-up means for taking up the transfer ribbon, and supply means for supplying the transfer ribbon according to the taking up of the transfer ribbon performed by the take-up means. The method is further characterized by a thermal transfer step of bringing the transfer ribbon between the supply means and the take-up means into contact with the transfer medium to thermally transfer an image to the transfer medium, and a regulating step of regulating the supply of the transfer ribbon performed by the supply means, by using a regulating means for regulating the supply of the transfer ribbon performed by the supply means, during a period when the thermal transfer step is not being performed.

With the image producing method described above, the supply of the transfer ribbon performed by the supply means is regulated by the regulating means in a period when thermal transfer is not performed to thereby suppress extra movement of the transfer ribbon. Therefore, the movement of the transfer ribbon is more accurately controlled, and thus costs related to the transfer ribbon can be reduced. Accordingly, costs incurred in producing an image are reduced.

According to the aspect, the step of regulating the supply of the transfer ribbon performed by the regulating means includes a first step, a second step and a third step. In the first step, the regulating means regulates the supply of the transfer ribbon performed by the supply means in a state where the transfer ribbon and the transfer medium are in contact, after thermal transfer performed by the thermal transfer means is finished. In the second step, the take-up means starts taking up the transfer ribbon in a state where the regulating means is regulating the supply of the transfer ribbon performed by the supply means. In the third step, the thermal transfer means releases contact between the transfer ribbon and the transfer medium caused by the thermal transfer means, after the take-up means starts taking up the transfer ribbon.

With this kind of configuration, the transfer ribbon is prevented from being loosened when the thermal transfer means is moved. Accordingly, the movement of the transfer ribbon is more accurately controlled, and costs incurred in producing an image are reduced.

Advantageous Effects of the Invention

The present invention can provide an image producing device, a transfer ribbon, an image producing method and a transfer device that are capable of reducing costs incurred in printing a hologram.

BRIEF DESCRIPTION OF THE DRAWINGS

FIG. 19 is a diagram illustrating a hologram ribbon in which a specified pattern that indicates the number of holographic images is formed in a detection mark.

FIG. 20 is a flowchart illustrating processing in the initialization process of the ribbon feeding mechanism of reading a specified pattern of a detection mark on the hologram ribbon illustrated in FIG. 18, and further forming the specified pattern.

DESCRIPTION OF REPRESENTATIVE EMBODIMENTS

Representative embodiments or modes for carrying out the present invention will be described in detail below with reference to the accompanying drawings. However, it is to be understood that the invention is not necessarily limited to these representative embodiments, which are being provided to be illustrative of the invention. In the descriptions of the figures, like reference signs will be used for like elements to omit duplicate description.

Figure 1:
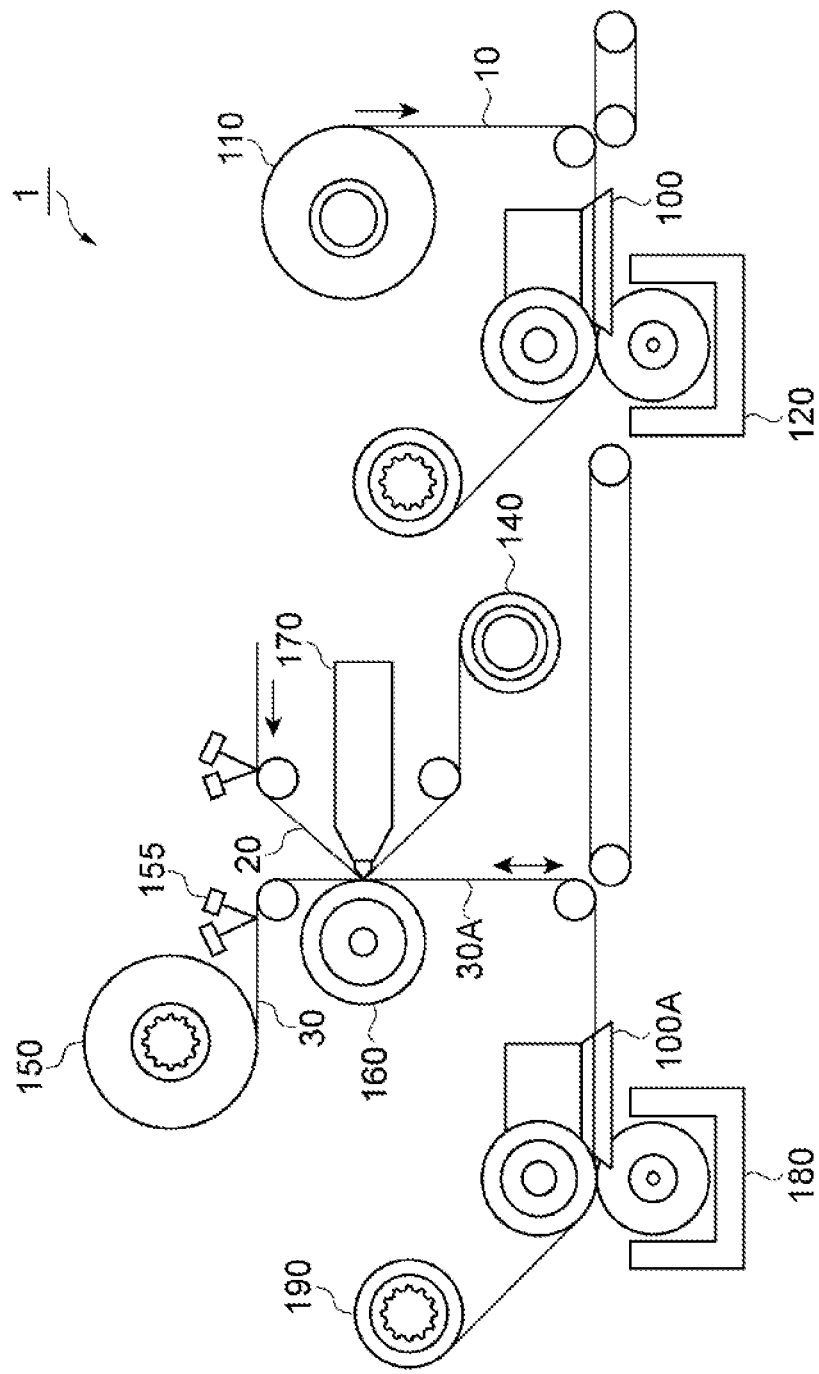
FIG. 1 is a schematic diagram of a hologram printer according to an embodiment.

FIG. 1 shows a basic configuration of a hologram printer that includes an image producing device of an embodiment of the present invention. A hologram printer 1 illustrated in FIG. 1 is a device that forms, on an object, an image which is formed with a holographic image by a so-called intermediate transfer method. Examples of the object include, but are not limited to, a personal identification medium such as a passport and ID (identification) card, and the like. Examples of the holographic image formed on the object include, but are not limited to, a personal facial image, and the like.

In the hologram printer 1, first, a primer ribbon 10 that is supplied from a supply roller 110 is affixed to an object 100 by heating and pressing the primer ribbon 10 against the object 100 using a heat roll 120. The primer ribbon 10 functions as an adhesive for suitably affixing a holographic image formed on a transfer foil 30A (transfer medium: transfer sheet), described later, to the object 100.

Next, a holographic image is formed on a transfer foil 30 (transfer medium: overlay) that is supplied from a supply roller 150, by performing thermal transfer printing, with the hologram ribbon 20 (transfer ribbon) that is supplied from a supply roller, not shown, and the transfer foil 30 in a superimposed state between a platen roller 160 and a thermal head 170 (thermal transfer means).

As the hologram ribbon 20, a known ribbon is used. Such a known ribbon has a structure in which a release layer that includes a thermoplastic resin or the like, an image-forming layer that includes a relief type hologram or diffraction grating or the like, and an image-receiving layer that includes a thermoplastic resin or the like are layered in that order on the top surface of a supporting medium that includes a resin film or the like. As the transfer foil 30, a known foil is used. Such a known foil has a structure in which an image-receiving layer is layered on a supporting medium that includes a resin film or the like. The image-receiving layer in this case is capable of receiving an image by transferring or printing an image-forming layer and adhesion layer of the hologram ribbon 20.

The hologram ribbon 20 and the transfer foil 30 are held between the platen roller 160 and the thermal head 170 in a state in which the image-receiving layer of the hologram ribbon 20 and the image-receiving layer of the transfer foil 30 face and come into contact with each other, and a group of heating elements provided to the thermal head 170 are selectively heated based on image information. As a result, an image pattern that is based on the image information is thermally transferred from the image-forming layer of the hologram ribbon 20 (primary transfer). The image information refers to information that is formed as a holographic image of a personal facial image, text and the like. In this way, the transfer foil 30 is provided with an image on which a holographic image is formed.

After that, a heat roll 180 heats and presses the transfer foil 30A on which the holographic image is formed against the object 100A to which the primer ribbon 10 has been transferred, whereby the image-receiving layer of the transfer foil 30A on which the holographic image is formed is thermally transferred to the object (secondary transfer). Then, a take-up roller 190 peels the supporting medium of the transfer foil 30A from the image-receiving layer so that only the image-receiving layer of the transfer foil 30A is affixed to the surface of the object 100.

In this way, in the hologram printer 1, an object that has an image that contains a hologram is produced by two transfer stages, i.e., a primary transfer stage from the hologram ribbon 20 to the transfer foil 30, and a secondary transfer stage from the transfer foil 30A to the object 100A.

Figure 2:
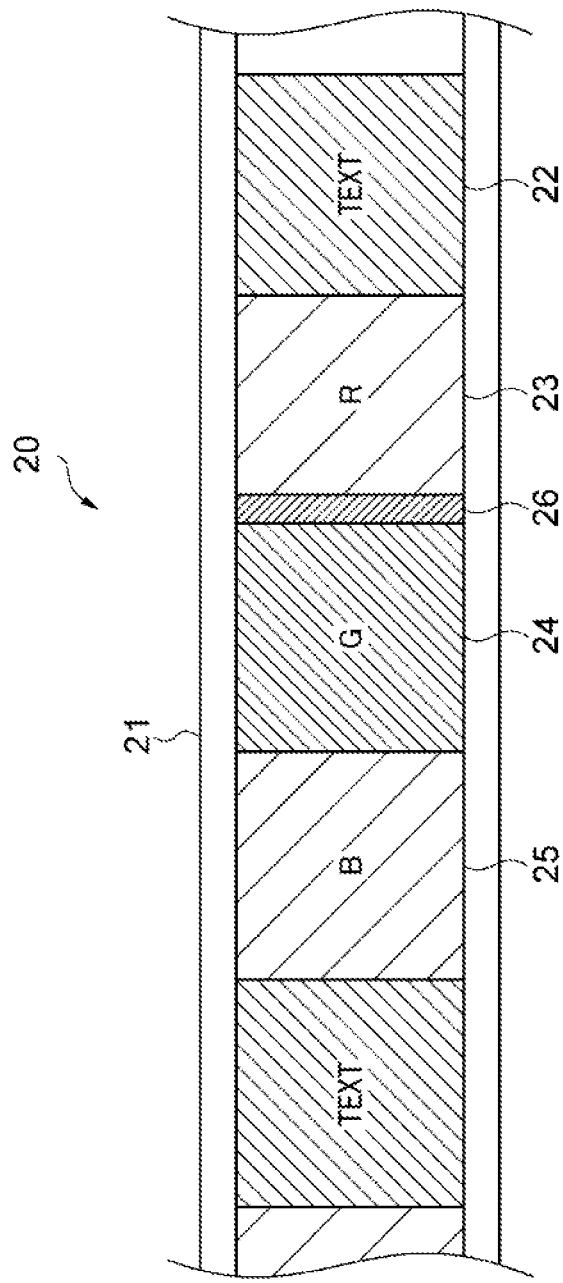
FIG. 2 is a diagram illustrating the configuration of a hologram ribbon that is used by a hologram printer.
Figure 3:
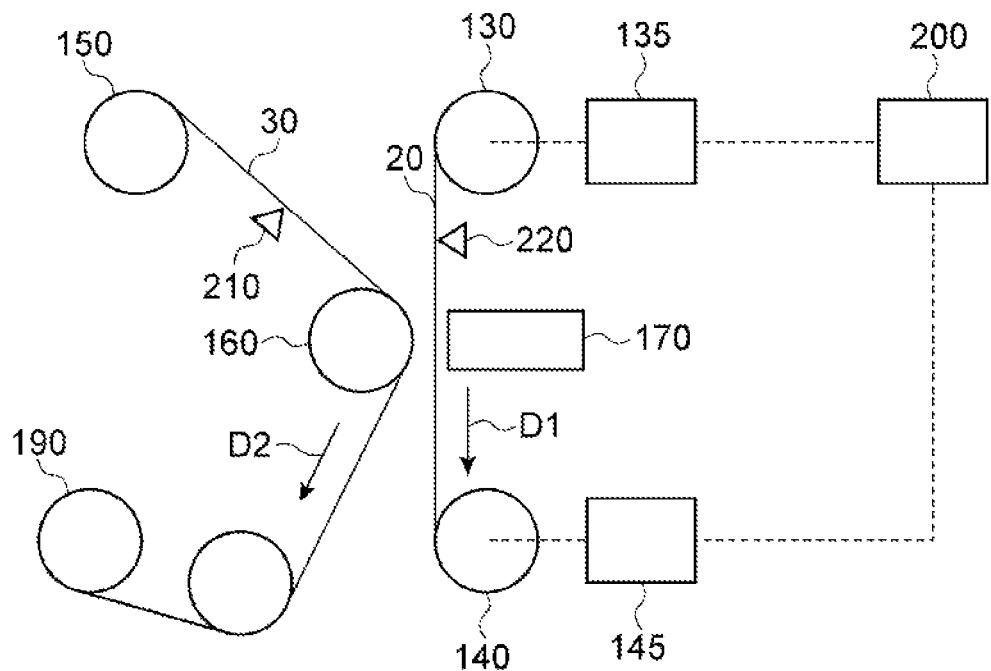
FIG. 3 is a diagram illustrating the configuration of an image producing device in a hologram printer.
Figure 4:
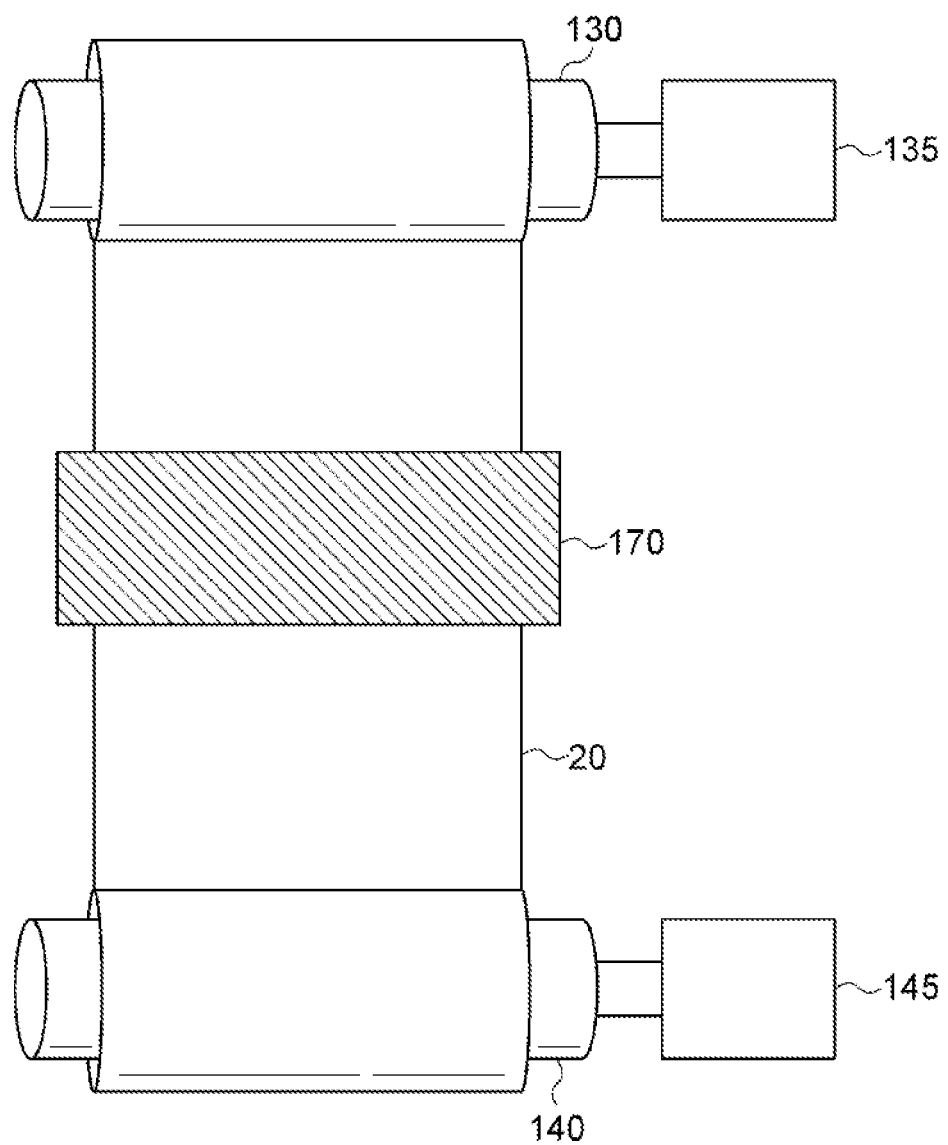
FIG. 4 is a diagram illustrating a feeding mechanism for feeding the hologram ribbon in an image producing device.

FIG. 2 illustrates the hologram ribbon 20 used in this hologram printer 1. FIG. 3 is a schematic diagram illustrating the portion of the hologram printer 1 near the platen roller 160 and the thermal head 170, which serve as an image producing device. FIG. 4 illustrates a portion of a first transfer unit that is related to feeding the hologram ribbon 20.

As illustrated in FIG. 2, the hologram ribbon 20 is such that four kinds of image-forming layers (panels) are repeatedly arranged in an array on a strip-shaped supporting medium 21. The four kinds of image-forming layers are a text image-forming layer 22, an R image-forming layer 23, a G image-forming layer 24 and a B image-forming layer 25, and these layers are repeatedly arranged in an array in that order. When forming a holographic image on the transfer foil 30A, image patterns are transferred to one holographic image-forming area by using the text image-forming layer 22, the R image-forming layer 23, the G image-forming layer 24 and the B image-forming layer 25. In other words, colors of the hologram are expressed by overlaying and transferring the image patterns of the four image-forming layers to the one area. The size of each of the image-forming layers 22 to 25 is determined according to the holographic image-forming area of the object. A positioning mark 26 for positioning the hologram ribbon 20 is provided between the R image-forming layer 23 and the G image-forming layer 24. The kinds of image-forming layers (panels) of the hologram ribbon 20 are not limited to those described above, and can be appropriately changed.

In order to form a holographic image on the transfer foil 30 by using such a hologram ribbon 20, it is necessary to move the transfer foil 30 back-and-forth between the platen roller 160 and the thermal head 170, while moving the hologram ribbon 20 in one direction. Therefore, as illustrated in FIG. 3, the transfer foil 30 is permitted to move back-and-forth over the platen roller 160 by controlling the drive of the supply roller 150 and the take-up roller 190. Positioning for the movement of the transfer foil 30 is performed by a sensor 210 that is provided between the supply roller 150 and the platen roller 160 reading a positioning mark (not shown) that is provided to the transfer foil 30.

However, control is performed so that the hologram ribbon 20 is moved in one direction while being supplied from the supply roller 130 (supply means) and taken up by the take-up roller 140 (take-up means). When performing transfer to the transfer foil 30, positioning of the hologram ribbon 20 is performed by a sensor 220 that is provided between the supply roller 130 and the thermal head 170 reading the positioning mark 26 (see FIG. 2) on the hologram ribbon 20. After positioning has been performed by the sensor 220, the hologram ribbon 20 and the transfer foil 30 become superimposed by the thermal head 170 being pushed out toward the platen roller 160, and the images are transferred by the group of heating elements of the thermal head 170 being selectively heated.

As illustrated in FIGS. 3 and 4, an electromagnetic brake 135 (regulating means) that regulates feeding of the hologram ribbon 20 from the supply roller 130 is provided in the hologram printer 1 of the present embodiment. A configuration is also possible in which other means capable of regulating feeding of the hologram ribbon 20 are provided. The take-up roller 140 is provided with a DC motor 145 for taking up the hologram ribbon 20. The electromagnetic brake 135 and the DC motor 145 are controlled by a control unit 200. The control unit 200 also controls the movement of the thermal head 170 and the transfer foil 30 (controls the supply roller 150 and the take-up roller 190).

In a conventional hologram printer 1, the movement of the hologram ribbon 20 is controlled by only controlling taking up of the take-up roller 140, or in other word, by controlling only the DC motor 145. This is because movement of the hologram ribbon 20 is in only one direction. However, in the conventional configuration, there are cases in which the length of the supplied hologram ribbon 20 differs depending on the diameter of the supply roller 130. Therefore, it has been so configured that even when the image-forming layers (panels) are made larger with respect to the size of the holographic image that is formed on the transfer foil 30, and the diameter of the curve formed by the hologram ribbon 20 on the supply roller 130 side changes, formation of the holographic image is performed accurately.

However, the hologram ribbon 20 is expensive, so maintaining large margins of the image-forming layers leads to an increase in the cost of forming holographic images. Moreover, a holographic image that is formed on the object 100A can also be personal information for identifying a person. Therefore, in order that image information is not taken out by using a hologram ribbon 20 after image transfer, there has been a need of further reducing the image-forming layers that are discarded.

As a method of controlling the movement of the hologram ribbon 20, a pinch-roller mechanism may be provided between the supply roller 130 and the take-up roller 140 of the hologram ribbon 20. However, when a pinch-roller mechanism is installed, the overall mechanical design of the hologram printer 1 becomes complicated, and accordingly the production cost may increase. Moreover, exchange of the hologram ribbon 20 in this case may involve complicated work of removing the pinch-roller mechanism.

However, the hologram printer 1 of the present embodiment includes the electromagnetic brake 135 which is mounted to the supply roller 130. Accordingly, by controlling the movement of the hologram ribbon 20 while controlling the electromagnetic brake 135, the hologram ribbon 20 can be moved more finely and accurately than in the case of a conventional configuration.

Figure 5:
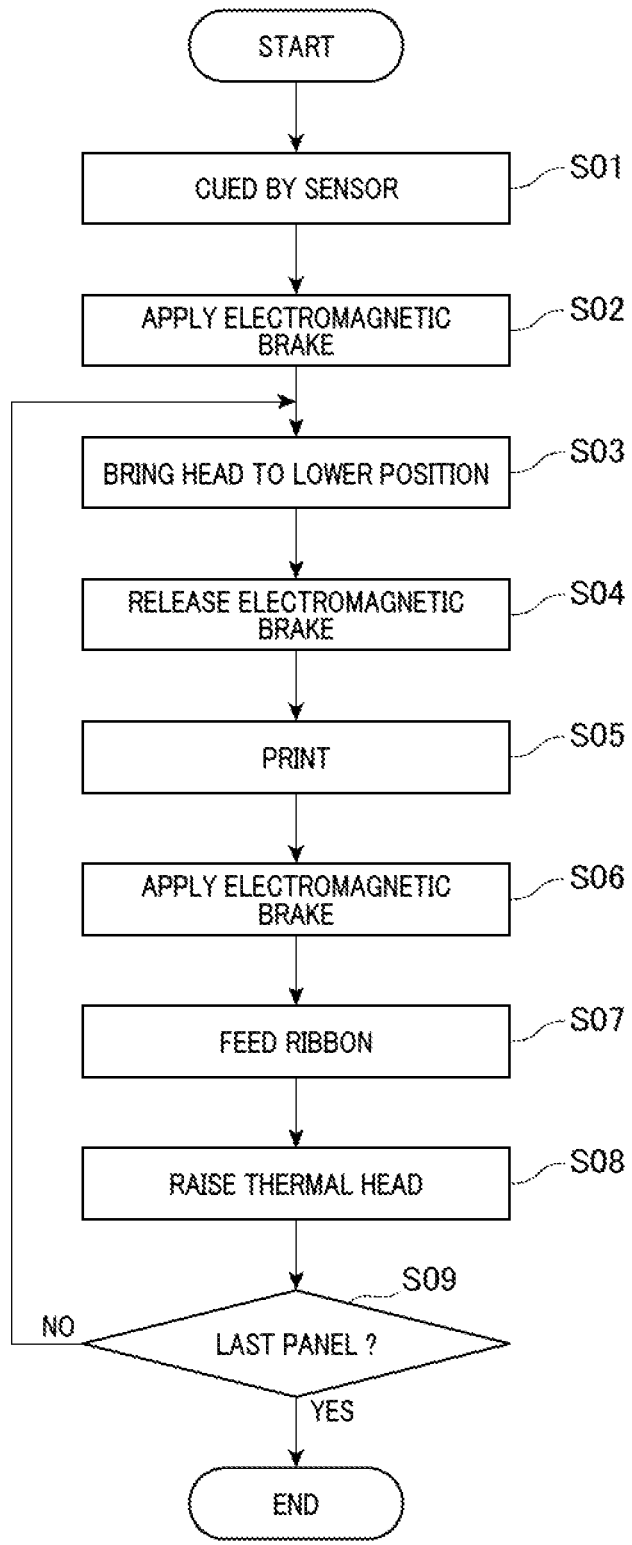
FIG. 5 is a flowchart illustrating control of an image producing device.
Figure 6:
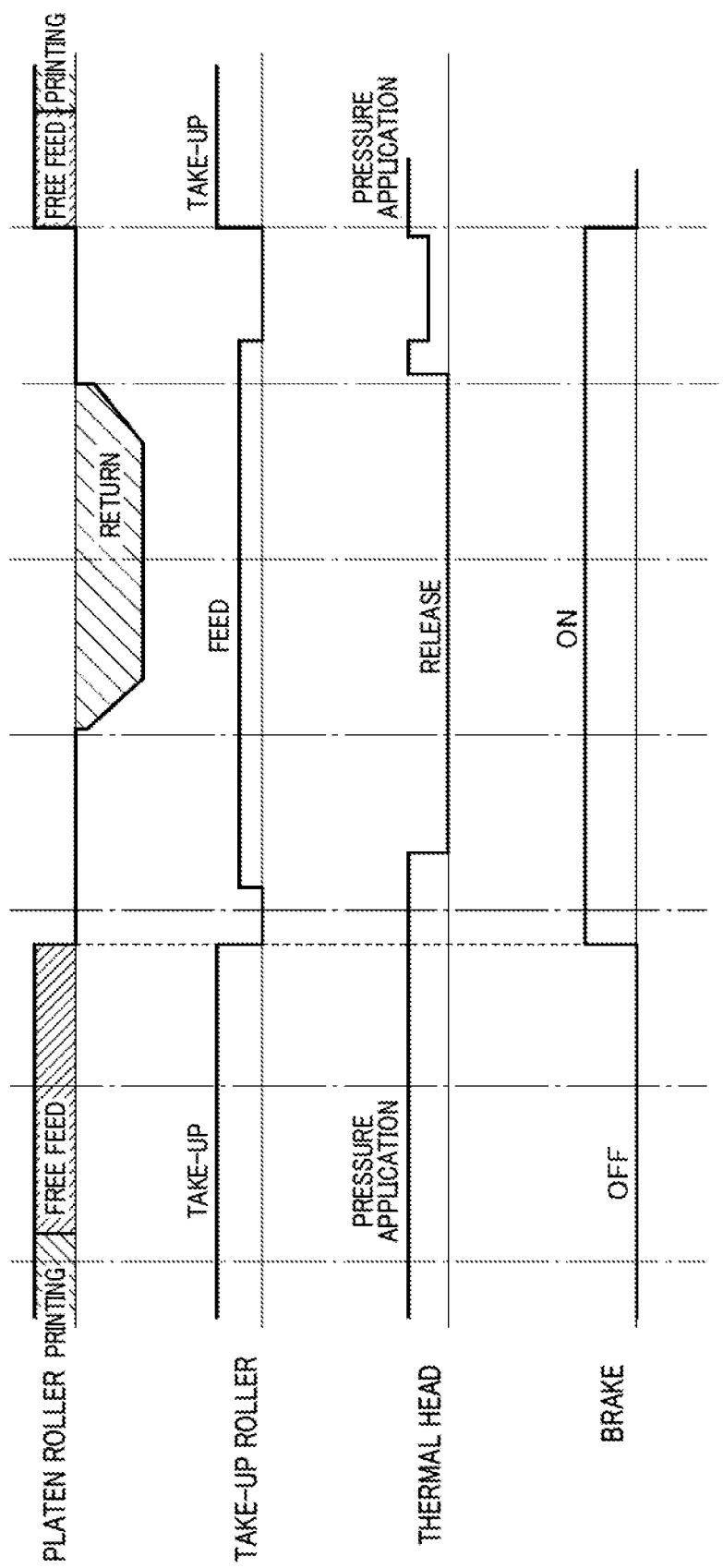
FIG. 6 is a timing chart for control of an image producing device.

With reference to FIGS. 5 and 6, the method of controlling the movement of the hologram ribbon 20 will be described in detail below.

First, as illustrated in FIG. 5, when transferring images from the hologram ribbon 20 to the transfer foil 30 (forming a holographic image), cueing (position adjustment) is performed using the sensors 210 and 220 (step S01). Position adjustment is performed respectively for the hologram ribbon 20 and the transfer foil 30.

Next, rotation of the supply roller 130 is regulated by applying the electromagnetic brake 135 (step S02). In this state, the thermal head 170 is lowered and pressed against the platen roller 160 (step S03). As a result, the hologram ribbon 20 is pressed against the transfer foil 30 in a taut state. After that, the electromagnetic brake 135 is released (step S04), and printing is performed in that state by thermal transfer (thermal transfer at step S05). In doing so, images are transferred from the hologram ribbon 20 to the transfer foil 30. During printing, the hologram ribbon 20 and the transfer foil 30 that are sandwiched between the thermal head 170 and the platen roller 160 are simultaneously moved by simultaneously driving the take-up roller 140 on the hologram ribbon 20 side and the take-up roller 190 on the transfer foil 30 side.

Next, after the electromagnetic brake 135 has been applied again (first step at step S06), the DC motor 145 is driven, and while starting movement of the hologram ribbon 20 (second step at step S07), the thermal head 170 is lifted and returned to the original position (third step at step S08). As a result, the surplus amount of the hologram ribbon 20 due to the thermal head 170 returning to the original position is taken up by the take-up roller 140 without the hologram ribbon 20 becoming loose. During the period of these steps (steps S06 to S08), rotation of the supply roller 130 is regulated by the electromagnetic brake 135 (regulation step).

Since printing is performed by using plural image-forming layers (panels) to form a holographic image, whether the panel is the last one is determined (step S09). When the panel for which printing has finished is not the last panel (NO at step S09), the thermal head 170 is lowered to print the next panel (step S03), and processing after that is continued. Before lowering the thermal head 170 to perform the next printing, the supply roller 150 and the take-up roller 190 are controlled so that the transfer foil 30 is returned to the original position.

However, when the panel for which printing has just finished is the last panel (YES at step S09), formation of the holographic image is terminated, after which the transfer foil 30 is moved by the take-up roller 190 and processing advances to formation of the holographic image of the next area.

FIG. 6 illustrates control of the platen roller 160, the take-up roller 140 on the hologram ribbon 20 side, the thermal head 170, and the electromagnetic brake 135, in respect of the movement of the transfer foil 30 after printing (step S05) until the subsequent printing. FIG. 6 illustrates that after printing on the transfer foil 30 has finished, the electromagnetic brake 135 is turned ON (step S06), after which the hologram ribbon 20 is fed by the take-up roller 140 (step S07), while pressure bonding by the thermal head 170 is released for return to the original position (step S08).

In this way, the hologram printer 1 of the present embodiment is configured such that, in a state in which the electromagnetic brake 135 is ON, the thermal head 170 is moved while the take-up roller 140 is performing the feeding operation. With this configuration, the hologram ribbon 20 is prevented from being loosened due to the movement of the thermal head 170. Moreover, the hologram ribbon 20 can be prevented from being moved excessively by the feeding operation of the take-up roller 140. In this way, movement of the hologram ribbon 20 can be controlled more accurately. Accordingly, it is not necessary to make the size of the image-forming layers (panels) extra-large with respect to the area where the holographic image is formed, and thus the cost of the hologram ribbon 20 is reduced.

Moreover, the hologram printer 1 of the present embodiment has an additional configuration including the electromagnetic brake 135 which is mounted to the supply roller 130 of the hologram ribbon 20 and controlled by the control unit 200 as well. Thus, the hologram printer 1 can achieve more accurate control of the movement of the hologram ribbon 20 than in conventional configuration. In this way, the hologram printer 1 of the present embodiment can improve its performance with the device configuration being changed to a simpler one, compared with the case of adding a pinch-roller mechanism to the conventional device configuration, for example. Thus, the hologram printer 1 is advantageous from the standpoint of reducing costs incurred in manufacture and in the work of replacing the hologram ribbon, and the like.

An embodiment of the present invention has been described so far, however the image producing device and image producing method of the present invention is not limited to the foregoing embodiment but may be modified in various ways.

For example, in the embodiment described above, a hologram printer 1 that includes an image producing device has been described. However, the image producing device of the present invention may include at least a configuration for producing the transfer foil 30A that has holographic images as a result of transferring images from the hologram ribbon 20 to the transfer foil 30.

In the present embodiment, the hologram printer 1 that includes an image producing device has been described. In the image producing device and image producing method of the present invention, the device produces a holographic image, for example, with transfer of an image to an object by a so-called intermediate transfer method, and it is not necessary for the image to include a hologram. In other words, the transfer ribbon for forming an image that will be transferred to the transfer foil 30 is not limited to a hologram ribbon. For example, a CMYK ribbon or the like for forming a photo or the like may be used.

Hereinafter, a modification of a hologram ribbon that is applied to the image producing device described above will be described. In the hologram printer 1 that includes an image producing device (image-forming device), the hologram ribbon (transfer ribbon) is demounted so often that, when remounting the hologram ribbon, it may become unclear which panels of the hologram ribbon are unused and which panels have been used. Therefore, when remounting the hologram ribbon, the thermal transfer start position may be erroneously determined, in the positioning process, to use an unused panel skipping several unused panels, not the unused panels next to the previously used panels. When starting to use the hologram ribbon again after skipping unused panels in this way, the skipped unused panels are wasted. Specifically, the following description addresses a hologram ribbon that can be used eliminating waste, and operation of an image producing device (hologram printer 1) when using this hologram ribbon.

Figure 7:
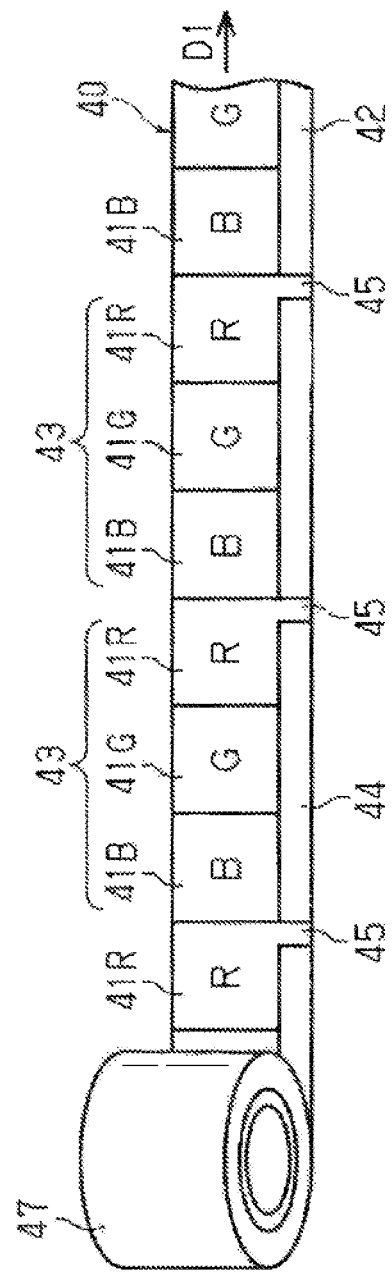
FIG. 7 is a diagram illustrating the hologram ribbon of the embodiment.

As illustrated in FIG. 7, in a hologram ribbon 40 (transfer ribbon) of this modification, a red panel 41R that generates red diffracted light, a green panel 41G that generates green diffracted light, and a blue panel 41B that generates blue diffracted light are provided on an elongated substrate material 42. More specifically, in the hologram ribbon 40, rectangular panels 41R, 41G and 41B are continuously arranged without spacing along the direction of the arrow D1, that is the feeding direction and also the lengthwise direction of the elongated substrate material 42. The substrate material 42 is made of a heat resistant resin because heat will be applied thereby by a transfer head (thermal head 170). A set of panels 41R, 41G and 41B that are arranged in that order form a panel set 43 that forms one unit image. The panel sets 43 are also continuous without there being a space in between. Furthermore, a margin 44 is provided on one side of the panels 41R, 41G and 41B that are arranged in the feeding direction. Margins 44 could also be provided on both sides.

A detection mark 45 is formed in the red panel 41R at the head of each panel set 43, in a direction that crosses the feeding direction. More specifically, the detection mark 45 is provided on the margin 44, in a direction that crosses the direction of the arrow D1, which is the feeding direction. The detection mark 45 is provided so as to be continuous with the red panel 41R, and has the same diffraction grating structure as the red panel 41R. With the detection mark protruded from the red panel 41R, the entire red panel 41R is effectively used for forming a holographic image. The detection mark 45, as will be described later, is used for detecting the red panel 41R at the head of each panel set 43.

Figure 8:
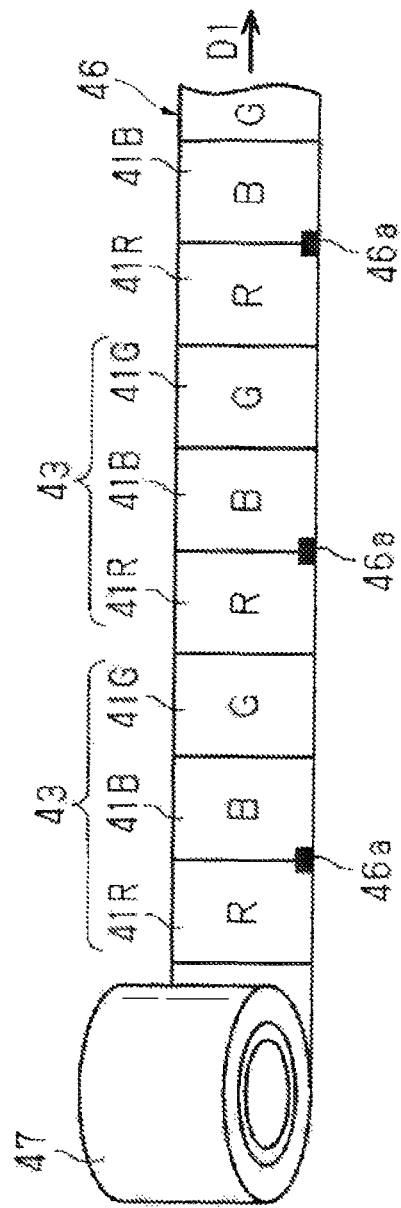
FIG. 8 is a diagram illustrating a reference example of a hologram ribbon on which detection marks are formed using black ink.

As illustrated in FIG. 8, in a hologram ribbon, a detection mark 46a may each be provided at the boundary between the red panel 41R and the blue panel 41B. In such a hologram ribbon 46, the detection mark 46a is formed using black ink by gravure printing or the like, and is formed so as not to have a diffraction grating structure as do the red panel 41R and the green panel 41G. In other words, the hologram ribbon 46 is formed such that after the panels 41R, 41G and 41B are printed, the detection mark 46a is printed by gravure printing or the like. In contrast to this, in the hologram ribbon 40, the detection mark 45 can be formed simultaneously with the red panel 41R. In this regard, the hologram ribbon 40 improves production efficiency more than does the hologram ribbon 46. In addition, the detection mark 45 can be formed with good precision.

The hologram ribbon 40 that is configured as described above is supplied from a supply roller 47 mounted to the supply roller 130 (supply means) and taken up by the take-up roller 140 (take-up means). More specifically, an unused hologram ribbon 40 is wound around the supply roller 47 and the used hologram ribbon 40 is wound around the take-up roll. Generally, the hologram ribbon 40 is mounted to the hologram printer 1 that includes the image producing device, with the supply roll 47 and the take-up roll rotatably stored in a cartridge, that is, the hologram ribbon 40 is mounted to the supply roller 130 and the take-up roller 140.

Figure 9:
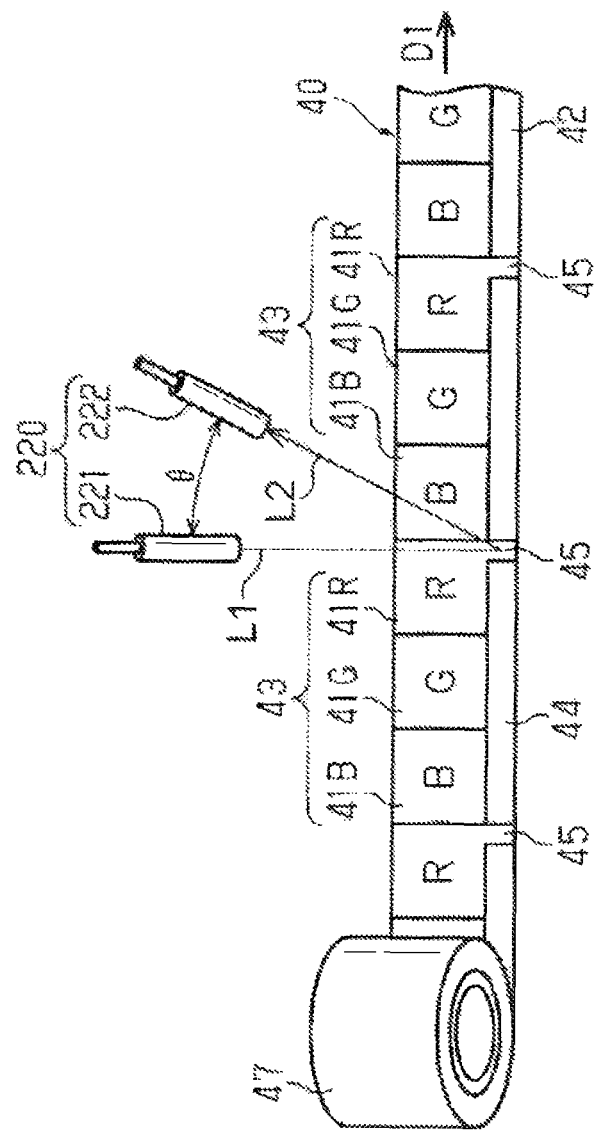
FIG. 9 is a diagram illustrating a state in which a detection mark on the hologram ribbon of the embodiment is detected by a first detection sensor.

The following description addresses an example in which the hologram ribbon 20 side sensor 220 in the hologram printer 1 serves as a first detection sensor that detects the detection mark 45 on the hologram ribbon 40. When the sensor 220 has a function for detecting the detection mark 45, the sensor 220, as illustrated in FIG. 9, includes a light-emitting unit 221 that emits a detection light L1, and a light-receiving unit 222 that detects diffracted light L2 that is reflected by the detection mark 45. With the light-emitting unit 221 emitting detection light L1 perpendicularly onto a detection mark 45, the light-receiving unit 222 is provided at a position that corresponds to the diffraction angle θ at the detection mark 45. The diffraction angle θ can be calculated from the spatial frequency of the detection mark 45 and the wavelength of the light that is emitted by the light-emitting unit 221.

Figure 10:
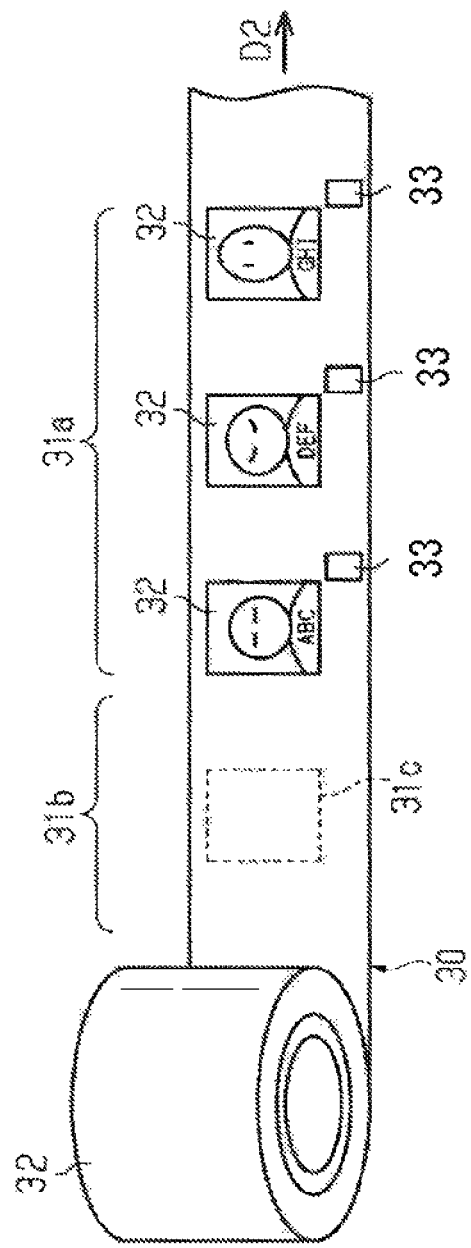
FIG. 10 is a diagram illustrating a state in which a holographic image is printed on a transfer foil of the image producing device of the embodiment.

As illustrated in FIG. 10, when a holographic image is further transferred to the transfer foil 30 (transfer medium: transfer sheet), the detection mark 45 is thermally transferred thereto together with the holographic image 32 to thereby form a transferred detection mark 33. More specifically, as illustrated in FIG. 10, in the transfer foil 30, holographic images 32 are formed thereon in a row in the feeding direction, and the transferred detection marks 33, which have been formed by thermally transferring thereto the detection marks 45 of the hologram ribbon 40, are formed so as to correspond to the respective holographic images 32. Each of the transferred detection marks 33 is formed so as to be spaced apart from the corresponding one of the holographic images 32.

The sensor 210 on the transfer foil 30 side in the hologram printer 1 has a configuration similar to that of the sensor 220 on the hologram ribbon 20 side, and includes a light-emitting unit that emits detection light, and a light-receiving unit that detects diffracted light reflected by the transferred detection marks 33. The sensor 210 serves as a second detection sensor that detects the transferred detection marks 33.

Figure 11:
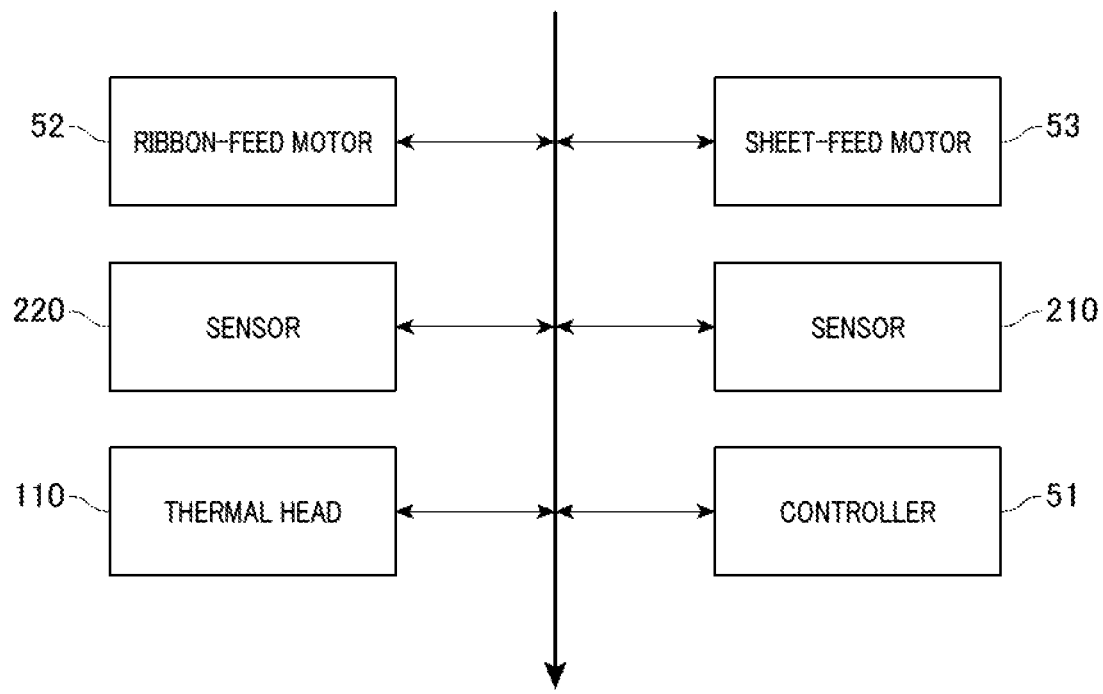
FIG. 11 is a block diagram of an image transfer device of the embodiment.

The embodiment described above has dealt with the case in which the control unit 200 only provides control over the hologram ribbon 20 side. However, the control unit 200 may also be implemented as a controller 51 that includes ROM, RAM, CPU and the like to ensure control of the overall operation of the image producing device. In that case, as illustrated in FIG. 11, the controller 51 as the control unit 200 drives a ribbon-feeding motor 52 for rotating the supply roller 130 and the take-up roller 140 of a ribbon-feeding mechanism for feeding the hologram ribbon 40, and drives a sheet-feeding motor 53 for rotating the supply roller 150 and the take-up roller 190 of a sheet-feeding mechanism for feeding the transfer foil 30. The controller 51 drives the thermal head 170 according to a pattern that corresponds to the red interference color, or a pattern that corresponds to the green interference color, or a pattern that corresponds to the blue interference color of the holographic image 32 to be formed. Results of detecting the detection mark 45 on the hologram ribbon 40 are inputted to the controller 51. Then, based on a detection mark 45 detected by the sensor 220, the controller 51 determines the head of the panel set 43, or in other words, determines a thermal transfer start position of the red panel 41R. The detection result of a transferred detection mark 33 of the transfer foil 30 is inputted to the controller 51. The controller 51 can be configured so that, based on the transferred detection mark 33 detected by the sensor 210, the controller 51 determines the transfer start position for the transfer foil 30.

Figure 12:
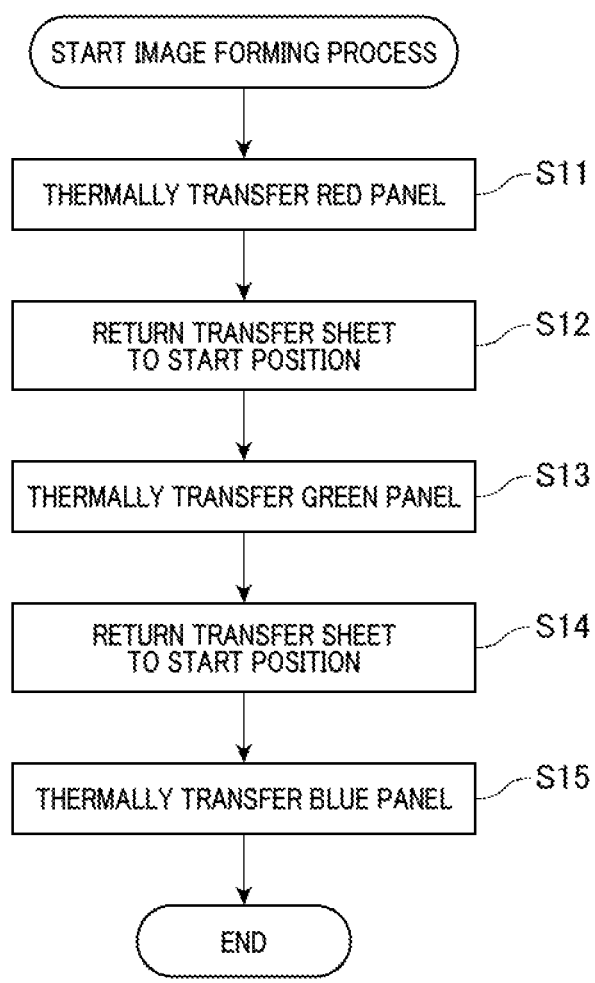
FIG. 12 is a flowchart illustrating an image forming process for forming a holographic image.

With reference to FIG. 12, the processing for producing an image will be described. FIG. 12 omits operations such as of the thermal head 170 illustrated in FIG. 5, and illustrates the printing (S05) process. When producing an image, first, the hologram ribbon 40 is mounted between the supply roller 130 and the take-up roller 140, and the transfer foil 30 is mounted between the supply roller 150 and the take-up roller 190. In this state, between the platen roller 160 and the thermal head 170, the hologram ribbon 40 faces the receiving layer of the transfer foil 30. When starting image formation, first, the thermal head 170 comes close to the platen roller 160, and the thermal head 170 and the platen roller 160 press the hologram ribbon 40 against the receiving layer of the transfer foil 30. As will be described in detail later, the hologram ribbon 40 is positioned so that the thermal head 170 is aligned with the leading edge in the feeding direction of the red panel 41R that is at the head of the panel set 43 to serve as the transfer start position. When continuously printing holographic images 32 as well, the controller 51 detects the detection mark 45 to thereby detect the leading edge of the red panel 41R at the head of each panel set 43. The position of the transfer foil 30 is also determined so that the position facing the thermal head 170 serves as the transfer start position.

As illustrated in FIG. 12, the controller 51 drives the thermal head 170 according to the pattern of the red interference color of the holographic image 32 to be thermally transferred to the transfer foil 30. At this time, the controller 51 causes the hologram ribbon 40 to synchronize with the transfer foil 30 for feeding in the directions of the arrows D1 and D2 (also see FIG. 3). As a result, a diffraction grating structure that corresponds to the red interference color is thermally transferred to the transfer foil 30 from the red panel 41R (step S11). The controller 51 thermally transfers the detection mark 45, which is continuous from the red panel 41R, to the transfer foil 30 to thereby form the transferred detection mark 33 on the transfer foil 30. After the processing for thermally transferring the red panel 41R is finished, the controller 51 releases the thermal head 170 from the platen roller 160, feeds the transfer foil 30 in the direction opposite the arrow D2, i.e. opposite the feeding direction, and repositions the transfer foil 30 so that the position facing the thermal head 170 is aligned with the transfer start position (step S12).

Next, the controller 51 again moves the thermal head 170 near the platen roller 36, and by way of the thermal head 170 and the platen roller 160, pressure bonds the hologram ribbon 40 to the receiving layer of the transfer foil 30. Then, the controller 51 drives the thermal head 170 according to the pattern of the green interference color of the holographic image 32 to be thermally transferred, causes the hologram ribbon 40 to synchronize with the transfer foil 30 for feeding in the directions of the arrows D1 and D2. In doing so, a diffraction grating structure that corresponds to the green interference color is thermally transferred to the transfer foil 30 from the green panel 41G (step S13). After finishing the processing for thermally transferring the green panel 41G, the controller 51 releases the thermal head 170 from the platen roller 160, feeds the transfer foil 30 in the direction opposite the arrow D2, i.e. opposite the feeding direction, and repositions the transfer foil 30 so that the position facing the thermal head 170 is aligned with the transfer start position (step S14).

Next, the controller 51 again moves the thermal head 170 near the platen roller 160, and by way of the thermal head 170 and the platen roller 160, pressure bonds the hologram ribbon 40 to the receiving layer of the transfer foil 30. Then, the controller 51, drives the thermal head 170 according to the pattern of the blue interference color of the holographic image 32 to be thermally transferred, while synchronizing the hologram ribbon 40 with the transfer foil 30 for feeding in the directions of the arrows D1 and D2. In doing so, a diffraction grating structure that corresponds to the blue interference color is thermally transferred to the transfer foil 30 from the blue panel 41B (step S15).

After the processing for thermally transferring the blue panel 41B is finished, the controller 51 releases the thermal head 170 from the platen roller 160. In this way, a diffraction grating structure that corresponds to the red interference color, a diffraction grating structure that corresponds to the green interference color, and a diffraction grating structure that corresponds to the blue interference color are thermally transferred to the transfer foil 30, and a holographic image 32 is formed. As illustrated in FIG. 10, each of transferred detection marks 33 is formed near the corresponding one of the formed holographic images 32, being spaced apart from the holographic image 32. The transferred detection mark 33, as will be explained next, is used for detecting the transfer start position of the transfer foil 30 during the initialization process.

The hologram printer 1 is a device that forms a hologram on an object for which forgery prevention is necessary, and the hologram ribbon 40 must also be safely managed. Therefore, in the hologram printer 1 that includes an image-transferring device, the hologram ribbon 40 is demounted from the main device when not in use such as at night. The demounted hologram ribbon 40 is stored in a safe place such as a vault. When the hologram printer 1 is not in use, the main power-supply to the hologram printer 1 is turned OFF, and the data used up to that time, e.g., the data indicating the number of holographic images 32 that have been thermally transferred using the hologram ribbon 40 that has been mounted, is deleted from the internal memory. The stored hologram ribbon is mounted again to the hologram printer 1 the next time the ribbon is used. In other words, each time the hologram ribbon 40 is mounted, the hologram printer 1 performs an initialization process and finds the transfer start position of the hologram ribbon 40. Similarly, the hologram printer 1 finds the transfer start position of the transfer foil 30. First, with reference to FIG. 13, the initialization process for the mechanism that feeds the hologram ribbon 40 will be described.

Figure 13:
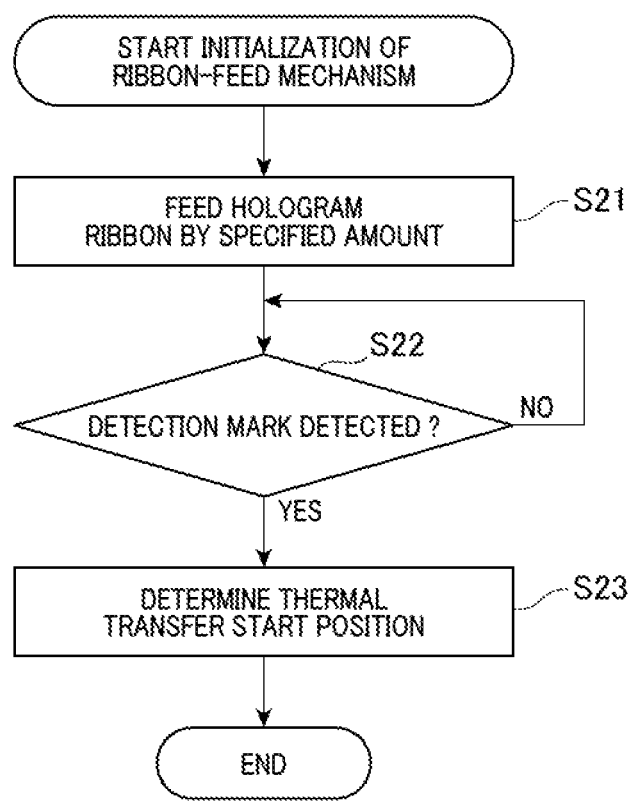
FIG. 13 is a flowchart illustrating an initializing process for the ribbon feeding mechanism.
Figure 14:
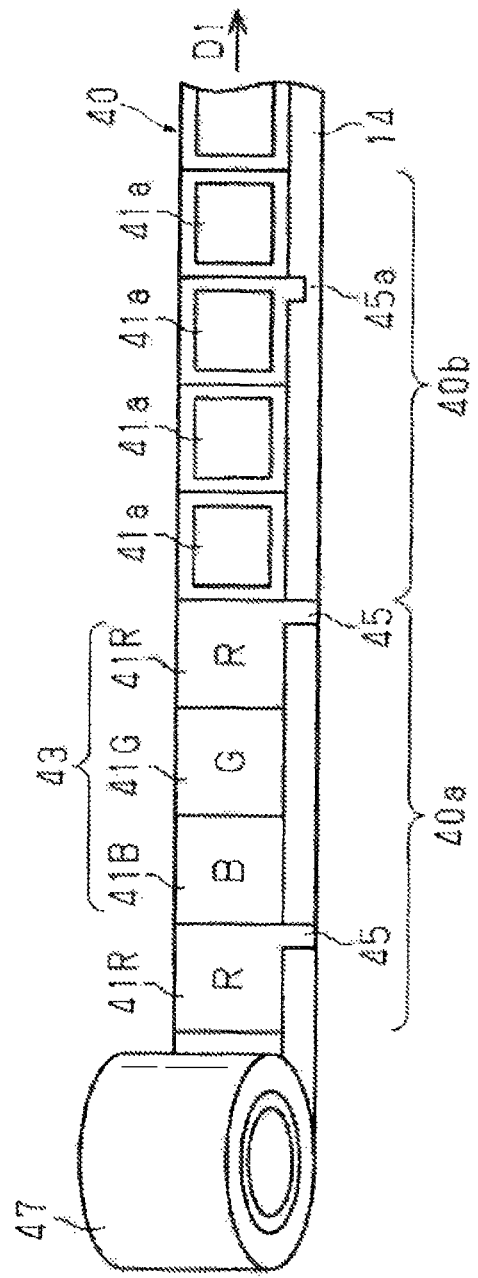
FIG. 14 is a diagram illustrating a state of the hologram ribbon when in use.

When the hologram ribbon 40 is mounted to the mounting section of the hologram printer 1, the thermal head 170 is in a state of being released from the platen roller 160, and the transfer foil 30 and the hologram ribbon 40 are not locked. As illustrated in FIG. 13, first, the controller 51, by way of the ribbon-feeding motor 52, moves the hologram ribbon 40 by a specified amount in the direction of arrow D1, which is the feeding direction, and then moves the hologram ribbon 40 by a specified amount in the direction opposite the arrow D1, which is the opposite direction from the feeding direction. In other words, the controller 51 moves the hologram ribbon 40 back-and-forth. When moving the hologram ribbon 40 in the direction of the arrow D1 and the direction opposite the arrow D1, the sensor 220, as illustrated in FIG. 9, irradiates the detection light L1 emitted by the light-emitting unit 221 onto a margin 44 of the hologram ribbon 40. As illustrated in FIG. 14, in an unused portion 40a of the hologram ribbon 40, the panels 41R, 41G and 41B are in an unused state, and the detection mark 45 is also in an unused state. Therefore, the detection mark 45 in the unused portion 40a can be detected by the sensor 220. However, in a used portion 40b, the panels 41R, 41G and 41B are in a used state, or in other words, the pattern is absent after being transferred to the transfer foil 30, leaving a post-transfer pattern 41a. Also, the detection mark 45 has been transferred to the transfer foil 30 and is absent from the margin 44, leaving a mark-absent section 45a. Therefore, the sensor 220 is not able to detect the detection mark 45 in the used portion 40b.

In many cases, the hologram ribbon 40 is pulled out from the supply roller 47 in the direction of the arrow D1, and the area where the detection mark 45 is detected first becomes the first panel set 43 of the unused portion 40a.

Returning to FIG. 13, next, the controller 51 monitors the output from the light-receiving unit 222 of the sensor 220 and determines whether the starting detection mark 45 has been detected (step S22). Specifically, the controller 51 determines whether the state of the detection mark 45 has transitioned from the undetected state to the detected state, or vice versa. This is because such an output switching portion becomes the boundary portion between the unused and used portions 40a and 40b. If the sensor 220 does not detect the detection mark 45, the controller 51 repeats determining whether the detection mark 45 has been detected (step S22). When doing this, configuration can be such that the hologram ribbon 40 is again moved by a specified amount.

Next, when the sensor 220 detects a detection mark 45 of the hologram ribbon 40, the controller 51 transports the leading edge of the red panel 41R at the head of the detected panel set 43 to the thermal head 170, and aligns the leading edge with the transfer start position (step S23). The controller 51 stores in advance the distance from the position of the sensor 220 to the position of the thermal head 170 in the internal memory, and feeds the hologram ribbon 40 by that distance in the direction of the arrow D1. In this way, the controller 51 is able to accurately detect the head of the unused portion 40a of the hologram ribbon 40. In other words, the hologram ribbon 40 starting from the first panel set 43 of the unused portion 40a can be used without skipping any unused panel sets 43 of the unused portion 40a. Even if a used hologram ribbon 40 that is different from the previously used hologram ribbon 40 is mounted, the head of the unused portion 40a of that hologram ribbon can be accurately detected and waste of the hologram ribbon 40 is eliminated. After finishing using the hologram ribbon 40, no unused portions 40a remain between the used portions 40b. Thus, management of the number of the printed holographic images 32 is accurately performed.

In the hologram printer 1, the distance between the sensor 220 and the thermal head 170 can be the same as the spacing between detection marks 45 that are adjacent in the feeding direction. In that case, after the sensor 220 detects the starting detection mark 45, the subsequently detected detection mark 45 becomes the transfer start position. In this way, when the distance between the sensor 220 and the thermal head 170 is made equal to the spacing between detection marks 45, the controller 51 can easily control feeding of the hologram ribbon 40.

Figure 15:
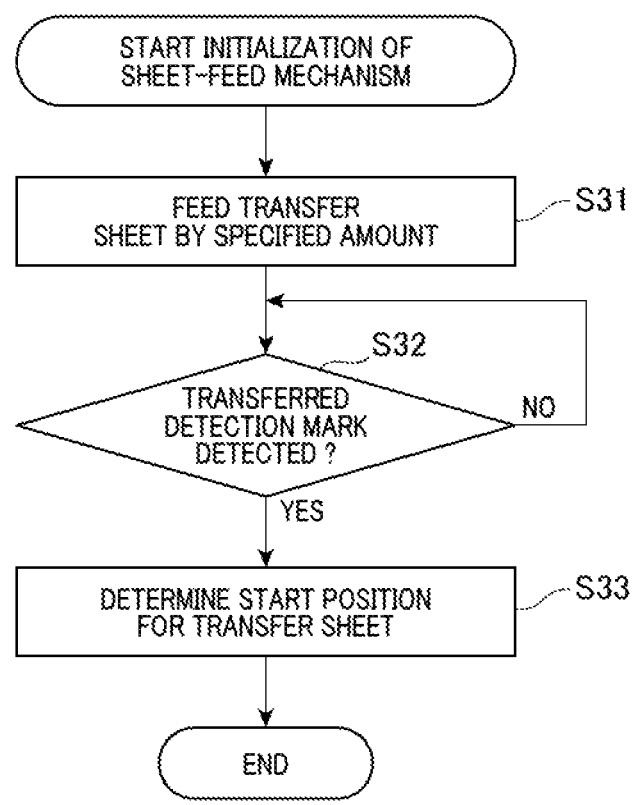
FIG. 15 is a flowchart illustrating an initializing process for a sheet feeding mechanism.

Referring now to FIG. 15, the initialization process for the sheet-feeding mechanism that feeds the transfer foil 30 will be described. When the hologram ribbon 40 is mounted to the mounting section of the hologram printer 1, the thermal head 170 is in a state of being released from the platen roller 160, and the transfer foil 30 and the hologram ribbon 40 are not locked. In this state, the controller 51 drives the sheet-feeding motor 53 and moves the transfer foil 30 by a specified amount in the direction of the arrow D2 that is the feeding direction, and then, moves the transfer foil 30 by a specified amount in the direction opposite the arrow D2 that is the direction opposite the feeding direction (step S31). While moving the transfer foil 30 in the direction of the arrow D2 and the direction opposite the arrow D2, the sensor 210 irradiates detection light onto a spot where a transferred detection mark 33 of the transfer foil 30 is to be formed. As illustrated in FIG. 10, each of the transferred detection marks 33 is formed near the corresponding one of the formed holographic images 32 on the transfer foil 30, so the sensor 210 is able to detect the transferred detection mark 33. However, with a transferred detection mark 33 being absent due to the absence of a holographic image 32 from the portion where it should be formed, the sensor 210 does not detect the transferred detection mark 33 from the portion.

Next, the controller 51 monitors the output of the light-receiving unit of the sensor 210, and determines whether a head transferred detection mark 33 has been detected in the direction opposite the arrow D2, which is the direction opposite the feeding direction (step S32). Specifically, the controller 51 determines whether the state of the transferred detection mark 33 has transitioned from the undetected state to the detected state, and vice versa. As illustrated in FIG. 10, this is because such an output switching portion becomes the boundary portion between a portion 31a where the holographic images 32 are formed and a portion 31b where the holographic images 32 are not formed. If a transferred detection mark 33 is not detected, the controller 51 repeats determining whether a transferred detection mark 33 has been detected (step S32). When doing this, configuration can be such that the transfer foil 30 is again moved by a specified amount.

Next, when the sensor 210 detects a transferred detection mark 33 of the transfer foil 30, the controller 51 transports the transfer start position at the head of the blank area 31c next to the area where the transferred detection mark 33 has been detected, to the thermal head 170, and performs alignment (step S33). The controller 51 stores in advance the distance from the position of the sensor 210 to the position of the thermal head 170 in the internal memory, and feeds the transfer foil 30 by that distance in the direction of the arrow D2, which is the feeding direction. In this way, the controller 51 is able to accurately detect the head of the blank area 31c of the transfer foil 30. In other words, holographic images 32 can be continuously formed on the transfer foil 30 without providing a blank area 31c next to the area where the last holographic image 32 has been formed.

When the configuration in the modification described above is used, the following advantageous effects are obtained.

(1) In the hologram printer 1 that includes an image producing device, the head of the unused portion 40a of a hologram ribbon 40 can be accurately detected. In other words, when resuming use of the hologram printer 1, the hologram ribbon 40 cab be used from the first panel set 43 of the unused portion 40a without skipping over any panel sets 43 of the unused portions 40a. Therefore, the hologram ribbon 40 can be used without any waste. Moreover, after use of the hologram ribbon 40, no unused portions 40a remain between used portions 40b. Thus, management of the number of the printed holographic images 32 can be accurately performed.

(2) In the hologram printer 1 that includes an image producing device, the head of the blank area 31c of the transfer foil 30 is accurately detected. In other words, holographic images 32 are continuously formed on a transfer foil 30 without providing a blank area 31c. Therefore, the transfer foil 30 is used without waste.

(3) As illustrated in FIG. 7, in the process of fabricating a hologram ribbon 40, a detection mark 45 of the hologram ribbon 40 can be formed simultaneously with forming panels 41R, 41G and 41B having diffraction grating structures. In other words, there is no need to form detection a mark 46a by gravure printing, as illustrated in FIG. 8. This contributes to suppressing increase of production processing in forming the detection mark 45.

(4) A detection mark 45 is formed in a direction that crosses the feeding direction, in the margin 44 of the red panel 41R at the head of the panel set 43. Therefore, the red panel 41R can be entirely and effectively used for forming the holographic image 32.

[Modifications of Detection Marks]

Figure 16:
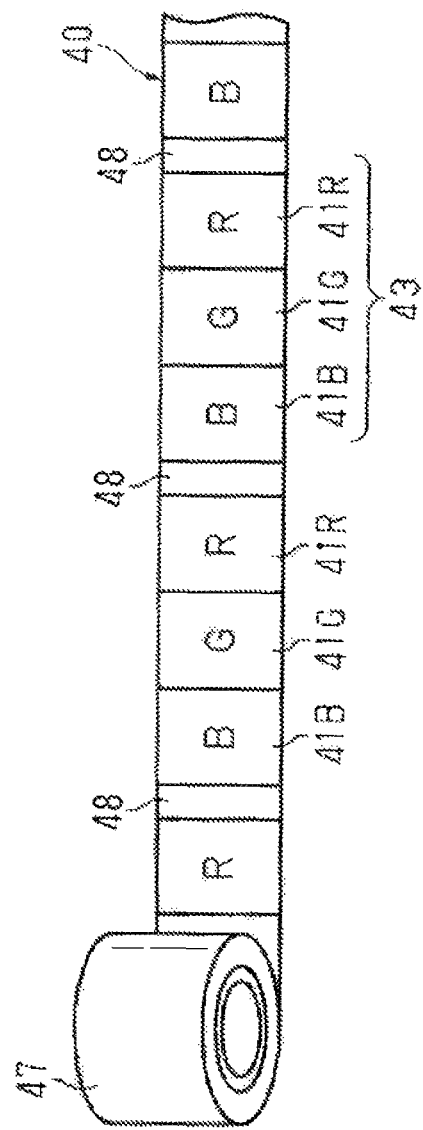
FIG. 16 is a diagram illustrating a hologram ribbon in which detection panels are provided between panel sets.

The detection mark 45 on the hologram ribbon 40 can be configured as illustrated in FIG. 16. In other words, as illustrated in FIG. 16, the hologram ribbon 40 is provided with a detection panel 48, instead of the detection mark 45, between panel sets 43 each including the panels 41R, 41G and 41B. The panels 41R, 41G and 41B have respective diffraction grating structures that unidirectionally cause diffraction toward the observer of the holographic image 32. Therefore, each of the detection panels 48 has a diffraction grating structure with a diffraction direction which is different, by 90° for example, from that of the diffraction grating structures of the panels 41R, 41G and 41B.

Figure 17:
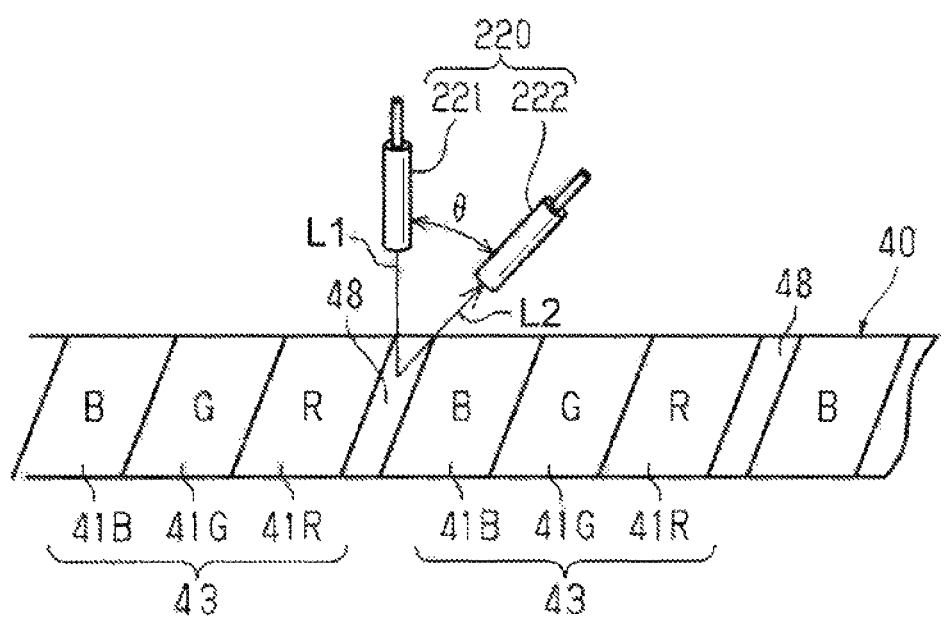
FIG. 17 is a diagram illustrating a state in which a detection panel on the hologram ribbon illustrated in FIG. 11 is detected by a first detection sensor.

The detection mark 45 described above is provided in the margin 44 of the hologram ribbon 40, and only the detection mark 45 having a diffraction grating structure needs to be detected. However, in the modification of FIG. 16, the detection panel 48 is provided continuously with the panels 41R, 41G and 41B that form a holographic image 32. Therefore, in the modification of FIG. 16, the diffraction direction of the detection panel 48 is ensured to be made different from the diffraction direction of the panels 41R, 41G and 41B. As illustrated in FIG. 17, the sensor 220 is provided above the panels 41R, 41G and 41B, not above the margin 44 of the hologram ribbon 40. Specifically, the light-emitting unit 221 of the sensor 220 emits a detection light L1 perpendicular to the detection panel 48, while the light-receiving unit 222 is provided at a position conforming to a diffraction angle $\theta$ of the detection panel 48. The diffraction angle $\theta$ is calculated from the spatial frequency and the wavelength of the detection light L1.

In the case of the hologram ribbon 40 illustrated in FIG. 16, it is no longer necessary to provide a margin on the side of the panels 41R, 41G and 41B for the detection panel 48, and thus the surface of the hologram ribbon 40 can be used efficiently accordingly. In other words, the width of the hologram ribbon 40 can be made narrower and the panels 41R, 41G and 41B can be made larger by the amount of the eliminated margin 44.

Figure 18:
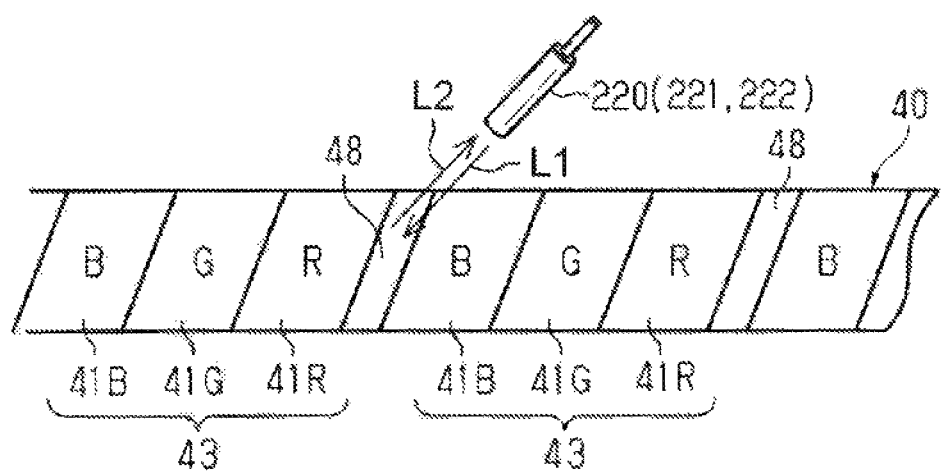
FIG. 18 is a diagram illustrating a state in which a detection panel that has a reflective structure with a scattering characteristic is detected by a first detection sensor.

As illustrated in FIG. 18, the detection panels 48 of the hologram ribbon 40 can each have a reflective structure having properties of scattering incident light. In that case, the light-emitting and -receiving units 221 and 222 of the sensor 220 can be provided regardless of the diffracting angle of the detection panel 48, while still maintaining positional accuracy with respect to the hologram ribbon 40. The positions of the light-emitting and -receiving units 221 and 222 of the sensor 220 may be the same.

Not all of the detection panels 48 illustrated in FIGS. 16 to 18 are transferred to the transfer foil 30, but as illustrated in FIG. 10, only part of them is transferred to the transfer foil 30. Of course, all of the detection panels 48 may be transferred.

[Management of the Number of Holographic Images]

A hologram printer 1 including the image producing device is a device that forms a holographic image on an object for which prevention of forgery is necessary, and it is also necessary to safely manage the hologram ribbon 40 as well. In the hologram printer 1, it is more preferable that the number of holographic images 32 that are printed from the hologram ribbon 40 can be managed. Therefore, the hologram printer 1 may be ensured to manage the number of holographic images 32 printed on the detection mark 45.

The controller 51 has a counter function that manages the number of printed holographic images 32. The controller 51 increments the current printing number by 1 when one holographic image 32 is printed from one panel set 43.

The controller 51 has a pattern-generating function of forming the current printing number on the detection mark 45 using a specified pattern. After printing of the current holographic image 32 is finished, the controller 51 increments the current printing number by 1, and based on the current printing data incremented by 1, generates a symbol with a specified pattern of one-dimensional code, such as barcode, or of two-dimensional code. Then, the controller 51 thermally transfers the specified pattern that has been generated according the current number data as a detection mark 45. The number data may be indicated by a numeral.

As illustrated in FIG. 19, the hologram ribbon 40 used in this case includes the panel sets 43 in each of which a detection mark 45 is formed in the red panel 41R at the head. The hologram ribbon 40 has a margin 44. The margin 44 is formed with a detection mark 45 having the same width as the red panel 41R in the feeding direction of the arrow D1. Since the detection mark 45 is formed so as to have the same width as the red panel 41R in the feeding direction of the arrow D1, when compared with the flake-shaped small detection mark 45 in FIG. 7, the surface area is large, and can record much more information. The detection mark 45 is formed in a specific pattern 45$b$ according the current number data. The hologram ribbon 40 is not formed with the specific pattern 45$b$ in the unused portion 40$a$, while in the used portion 40$b$, the specific pattern 45$b$ is formed as a post-transfer pattern.

With reference to FIG. 20, a process of management of the number of printed holographic images 32 will be described.

The controller 51 drives the ribbon-feeding motor 21$a$ and moves the hologram ribbon 40 by a specified amount in the direction of the arrow D1, which is the feeding direction, and then moves the hologram ribbon 40 by a specified amount in the direction opposite of the arrow D1, which is the direction opposite from the feeding direction. At this time, as illustrated in FIG. 9, the sensor 220 irradiates the detection light L1 emitted from the light-emitting unit 221 onto the margin 44 of the hologram ribbon 40. Then, the controller 51 monitors the output of the light-receiving unit 222 of the sensor 220 and determines whether a detection mark 45 has been detected (step S41). When a detection mark 45 has not been detected, the controller 51 repeats step S31.

When the sensor 220 detects a detection mark 45 on the hologram ribbon 40 (YES at step S41), the controller 51 reads the specific pattern 45$b$ of the detection mark 45, decodes the data of the specific pattern 45$b$, and generates number data (step S42). This decoded number data indicates the number data of the holographic image 32 formed last when the hologram printer 1 was used previously. To record the number data of the holographic image 32 that is to be printed next in the detection mark 45 using the specific pattern 45$b$, the controller 51 increments the read number data by 1 and generates the current number data (step S43).

When starting to use a hologram ribbon 40, or in other words, when a new hologram ribbon 40 has been mounted to the hologram printer 1, the controller 51 records a specific pattern 45$b$ indicating that the holographic image 32 to be printed next is the first one, on the detection mark 45 of the panel set 43 at the head of the hologram ribbon 40. When an input signal indicating start of using a new hologram ribbon 40 is inputted through an operating unit configured by operation buttons and the like, the controller 51 determines that the first holographic image 32 is being printed. Then, the controller 51, using a specific pattern 45$b$, records number data in the detection mark 45 indicating the first image.

The controller 51 then transports the leading edge of the red panel 41R at the head of the detected panel set 43 to the thermal head 170, and aligns the leading edge with the transfer start position (step S44). After this, the controller 51 resumes printing of holographic images 32 and then starts the process for the first thermal transfer. Thus, a pattern that corresponds to the red interference color conforming to the image data is thermally transferred to the transfer foil 30 from the red panel 41R. When doing this, a specific pattern 45$b$ indicating the number data of the holographic image 32 to be formed next using that panel set 43 is formed in the detection mark 45 integrally formed with the red panel 41R. Each time a holographic image 32 is formed, the number data is incremented by 1 and the incremented value is recorded in the detection mark 45 using the specific pattern 45$b$. Therefore, in the hologram printer 1, when the hologram ribbon 40 is demounted from the device and operation is not performed continuously, it is possible to know the number of holographic images 32 that have been transferred up to that time by reading the specific pattern 45$b$ of the detection mark 45 in the initialization process when resuming operation, and thus management of the number of holographic images 32 is accurately performed.

The hologram printer 1 that includes the image-transferring device described above may also be implemented with modifications described below.

A panel set 43 that includes panels 41R, 41G and 41B has been provided on a hologram ribbon 40 for forming a color holographic image 32, however, when forming a single-color holographic image 32, only one panel may be provided. In that case, a detection mark 45 is formed on that panel.

The order of panels in one panel set 43 is not limited to the order of red panel 41R, green panel 41G and blue panel 41B. Further, the detection mark 45 may be provided continuously with the red panel 41R, or may be provided discontinuously with the panel, separated by a space.

Instead of providing a detection mark 45 protruding from the panel 41R or providing a detection panel 48, a specified area in part of the panel 41R, 41G or 41B may be used as a detection mark 45. For example, a specified area in one corner of the rectangular shaped panel 41R, 41G or 41B may be used as a detection mark 45.

The hologram ribbon 40 may be ensured to be always taken up by the supply roller 47 when demounted from the hologram printer 1. In this case, in the initialization process for detecting a detection mark 45, the hologram ribbon 40 may be pulled out from the supply roller 47 to determine the spot where a detection mark 45 is detected first, as being the first unused panel set 43. In other words, in the initialization process, instead of feeding the hologram ribbon 40 in a direction opposite the arrow D1, which is a direction opposite the feeding direction, the hologram ribbon 40 only needs to be moved in the direction of the arrow D1, which is the feeding direction. Alternatively, the hologram ribbon 40 may always be ensured to be taken up by the take-up roll when demounted from the hologram printer 1, contrary to the example described above. In this case, in the initialization process for detecting a detection mark 45, the hologram ribbon 40 may be pulled out from the take-up roll to determine the spot where a detection mark 45 was detected last, as being the first unused panel set 43.

When the unused portion 40a of the hologram ribbon 40 can be detected by causing the sensor 220 to detect a detection mark 45, the hologram printer 1 does not have to include a sensor 210 for detecting a transferred detection mark 33 or the like.

Negative pattern remains as the post-transfer patterns 41a of the used portion 40b of the hologram ribbon 40. A hologram ribbon 40 that has been completely used may be destroyed such as by shredding so that the remaining patterns cannot be distinguished.

(Subjunction)

The present specification includes the following subject matter:

(1) An image transferring device (image producing device) that includes:

a ribbon-feeding device that feeds a hologram ribbon (transfer ribbon) that includes panels having a diffraction grating structure, the panels being repeatedly formed on an elongated substrate material in a feeding direction that is a lengthwise direction of the substrate material, and a detection mark having a reflective structure;

a sheet-feeding mechanism that feeds a transfer sheet (transfer medium) onto which the panels are transferred;

a transfer head that thermally transfers the panels on the hologram ribbon onto the transfer sheet, the hologram ribbon being laid over the transfer sheet;

a detection sensor that detects the detection mark; and a controller that drives the thermal head and causes the thermal head to thermally transfer the panels conforming to an image to be recorded, onto the transfer sheet, and to thermally transfer the detection mark onto the transfer sheet, wherein:

the controller causes the ribbon-feeding mechanism to further feed the hologram ribbon during an initialization process; and when the detection sensor detects the detection mark at the head in the feeding direction, a thermal transfer start position is determined for the panels corresponding to the detected detection mark.

(2) The image-transferring device according to (1), wherein the detection sensor is a first detection sensor;

the image-transferring device further includes a second detection sensor that detects a transferred detection mark that is the detection mark that has been thermally transferred onto the transfer sheet;

the controller further causes the sheet-feeding mechanism to feed the transfer sheet during the initialization process; and when the transferred detection mark is detected by the second detection sensor, a transfer start position is determined for the transfer sheet.

(3) The image-transferring device according to (1) or (2), wherein the detection mark is formed concurrently with the panels.

(4) The image-transferring device according to any one of (1) to (3), wherein the detection mark has a diffraction grating structure as the reflective structure.

(5) The image-transferring device according to (1) or (2), wherein:

the detection mark is a detection panel provided between the panels; and the detection panel has a diffraction grating structure, as the reflective structure, in a diffraction direction different from the diffraction direction of the panels.

(6) The image-transferring device according to (1) or (2), wherein:

the detection mark is a detection panel provided between the panels; and the detection mark has scattering properties of scattering incident light with the reflective structure.

(7) The image-transferring device according to (1), wherein:

the controller causes the transfer head to thermally transfer the detection mark onto the transfer sheet, using a specific pattern generated according to number data of the number of images transferred onto the transfer sheet; and during the initialization process, the number data of the number of images transferred is generated from the specific pattern detected by the detection sensor.

(8) The image-transferring device according to any one of (1) to (7), wherein:

the hologram ribbon including plural kinds of panels that have diffraction grating structures different from each other as the reflective structure and are arranged in the feeding direction to serve as a panel set for forming a unit image, the panel set being repeatedly formed; and the detection mark is formed to correspond with a head panel of the panel set in the feeding direction of the hologram ribbon.

(9) The image-transferring device according to (2), wherein the controller causes the ribbon-feeding mechanism to feed the hologram ribbon in the feeding direction and in a direction opposite the feeding direction during the initialization process, and causes the first detection sensor to detect the starting detection mark at the head in the feeding direction.

(10) The image-transferring device according to (2) or (9), wherein the controller causes the sheet-feeding mechanism to feed the transfer sheet in the feeding direction and in a direction opposite the feeding direction during the initialization process, and causes the second detection sensor to detect the starting transferred detection mark at the head in the direction opposite the feeding direction of the transfer sheet.

(11) A hologram ribbon that includes:

an elongated substrate material;

panels having a diffraction grating structure and repeatedly provided on the elongated substrate material; and a detection mark having a reflective structure and formed on the panels.

REFERENCE SIGNS LIST

1 Hologram printer
20, 40 Hologram ribbon
30 Transfer foil
130, 150 Supply roller
140, 190 Take-up roller
135 Electromagnetic brake
145 DC motor
200 Control unit
210, 220 Sensor

What is claimed is:

1. An image producing device that produces an image by transferring an image pattern from a transfer ribbon to a transfer medium by thermal transfer, comprising:

take-up means for taking up the transfer ribbon;
supply means for supplying the transfer ribbon according to the taking up of the transfer ribbon performed by the take-up means;
thermal transfer means for thermally transferring an image to the transfer medium by bringing the transfer ribbon that is between the supply means and the take-up means into contact with the transfer medium; and
regulating means for regulating the supply of the transfer ribbon performed by the supply means; and,
wherein the transfer ribbon includes an elongated substrate material on which panels having a diffraction grating structure are repeatedly formed in a feeding direction that is a lengthwise direction of the substrate material, and includes a detection mark having a reflective structure; and,
the image producing device further comprising:
- a first detection sensor that detects the detection mark; and
- a controller that drives a thermal head included in the thermal transfer means, and causes the transfer head to thermally transfer the panels conforming to an image to be recorded, onto the transfer medium, while causing the transfer head to thermally transfer the detection mark onto the transfer medium;

the controller causes a ribbon feeding mechanism to feed the transfer ribbon during an initialization process; and
when the detection mark at the head in the feeding direction is detected by the first detection sensor, the controller determines a thermal transfer start position for the panel corresponding to the detected detection mark.

2. The image producing device of claim 1, wherein:
the image producing device further comprises a second sensor that detects a transferred detection mark that is the detection mark thermally transferred to a transfer medium;
the controller causes a sheet-feeding mechanism to feed the transfer medium during the initialization process; and
when the transferred detection mark at the head is detected by the second detection sensor, the controller determines a transfer start position for the transfer medium.

3. The image producing device of claim 2, wherein:
the controller causes the thermal head to thermally transfer the detection mark to the transfer medium with a specific pattern generated according to data that indicates the number of the images that have been transferred to the transfer medium; and
during the initialization process, the controller generates data from the specific pattern detected by the detection sensor, the data indicating the number of the images that have been transferred.

4. The image producing device of claim 2, wherein, during the initialization process, the controller causes the ribbon-feeding mechanism to feed the transfer ribbon in the feeding direction and in a direction opposite the feeding direction, and causes the first detection sensor to detect the detection mark at the head in the feeding direction.

5. The image producing device of claim 2, wherein, during the initialization process, the controller causes the sheet-feeding mechanism to feed the transfer medium in the feeding direction and in a direction opposite the feeding direction, and causes the second detection sensor to detect the transferred detection mark at the head in the direction opposite the feeding direction of the transfer medium.

6. A transfer ribbon used in the image producing device of claim 1, comprising:
an elongated substrate material;
panels having a diffraction grating structure and repeatedly provided on the elongated substrate material; and
a detection mark having a reflective structure and formed on the panels.

\* \* \* \* \*